United States Patent [19]

Marantette et al.

[11] 4,017,203
[45] Apr. 12, 1977

[54] HIGH SPEED DRILL SYSTEM

[76] Inventors: William F. Marantette; Ruth B. Marantette, both of 20624 Earl St., Torrance, Calif. 90503

[22] Filed: Apr. 14, 1976

[21] Appl. No.: 677,035

[52] U.S. Cl. .................................. 408/240; 279/1 C
[51] Int. Cl.² ..................... B23B 31/10; B23B 5/22
[58] Field of Search ................. 408/240; 279/1 C

[56] References Cited

UNITED STATES PATENTS

| | | | |
|---|---|---|---|
| 3,692,319 | 9/1972 | Taylor | 279/1 C |
| 3,709,508 | 1/1973 | Dudley | 279/1 C |
| 3,837,661 | 9/1974 | Phillippi | 279/1 C |

*Primary Examiner*—Harrison L. Hinson
*Attorney, Agent, or Firm*—Ralph B. Pastoriza

[57] ABSTRACT

The system includes a spindle for holding a high speed drill, the spindle being provided with longitudinal slots permitting its exterior side walls to be biased inwardly and grip the drill. Eccentric weights surround the spindle in such a manner that upon rotation of the spindle at a high speed, the weights are thrown radially outwardly to contract the side walls of the spindle by centrifugal force, thereby gripping the drill shank, the gripping force increasing with the speed of rotation of the spindle. For larger drills, a special collar is provided on the drill shank for engaging flats provided on the spindle to result in a positive locking of the drill shank for rotation with the spindle.

5 Claims, 8 Drawing Figures

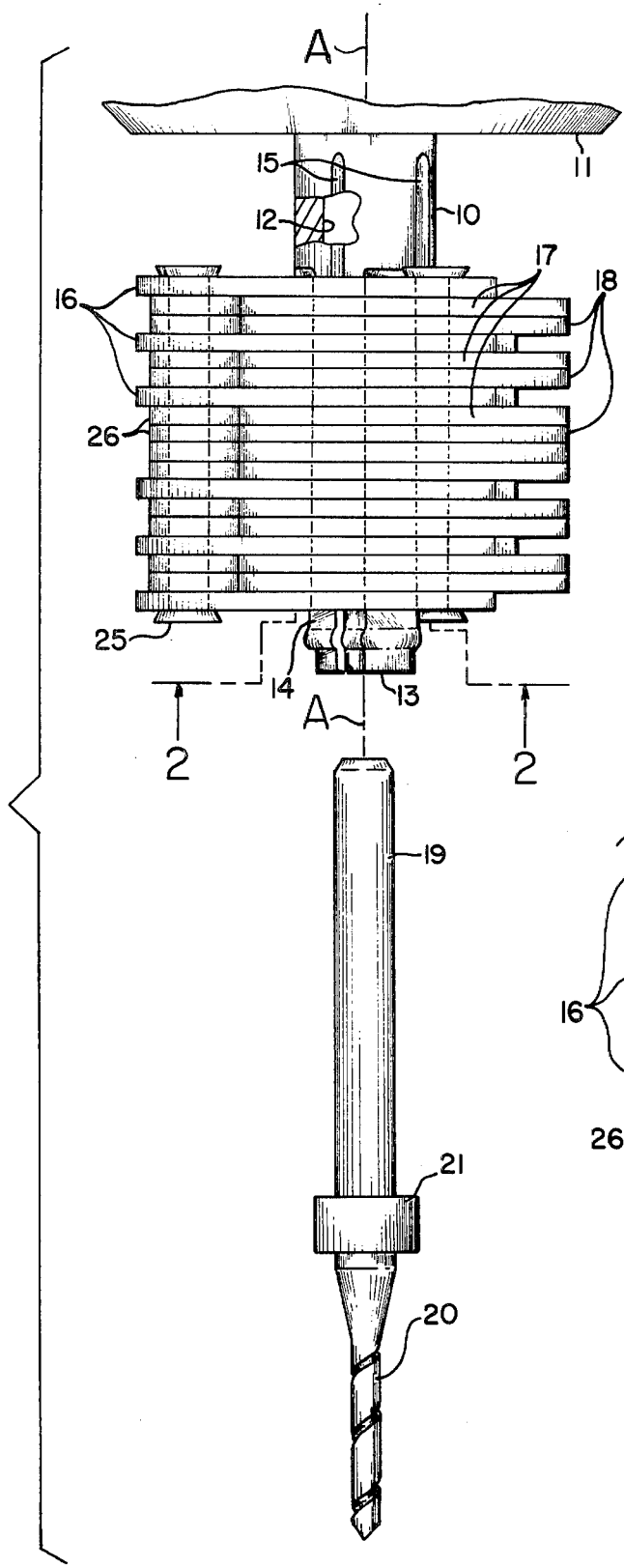
FIG. 1
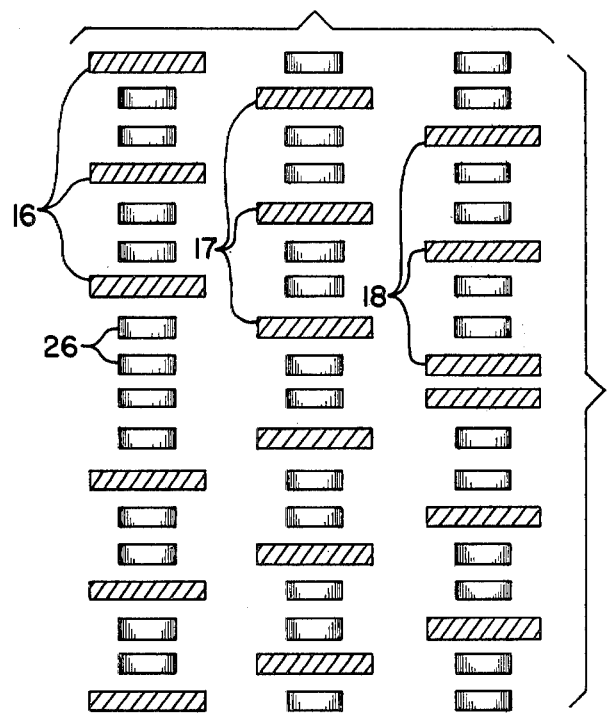
FIG. 2
FIG. 3

HIGH SPEED DRILL SYSTEM

This invention relates generally to a high speed drill system and more particularly to a system for drilling printed circuit boards wherein a specially designed drill spindle is provided for holding the shank of the drill by centrifugal force.

BACKGROUND OF THE INVENTION

The drilling of printed circuit boards for providing accurately located and well defined openings for receiving the leads of electrical components is a well known art. Usually, the shank of the drills themselves may be of the order of 1/8 inch in diameter and are rotated at an extremely high speed by a motor driven holding spindle. Oftentimes a plurality of spindles are provided for holding a like plurality of drills so that simultaneous drilling of various holes in a number of circuit boards in side by side relationship can be carried out.

Normally, the drill shanks are held in the spindles by jeweler type collets with set screws to assure concentricity and reliability in the proper gripping of the drill shank. Such collets are not only expensive, particularly where several are required in the case of multiple drill systems, but in addition the changing of drills can become somewhat time consuming in that the set screws must be loosened and then retightened with the new drill shank in position.

In an effort to simplify the replacement of drills or the substitution of different drills in a spindle arrangement, it has been proposed to provide a centrifugal type holder for the drill shank wherein the drill structure can be very easily slipped into the spindle and then after starting the drill, centrifugal forces develop which result in a tight gripping of the drill. There is only one type of centrifugal holding arrangement of which we are aware and in this particular system, the drill is provided with a specially made cylinder of larger diameter than the drill shank in turn designed to fit within the spindle. Upper sections of this cylinder are free to move radially outwardly under centrifugal force such that they will frictionally engage the inside wall of the spindle bore receiving the cylinder and thus hold the drill to the spindle by centrifugal force under high speed rotation of the spindle.

While the foregoing centrifugal system permits fairly rapid interchanging of drills, each drill must be provided with the specific type of cylinder for cooperation with the spindle and again a relatively high cost is involved. Moreover, problems have developed with this type of centrifugal system in assuring concentricity of the drill as well as dynamic balancing of the system generating the centrifugal forces.

BRIEF DESCRIPTION OF THE PRESENT INVENTION

With the foregoing considerations in mind, the present invention contemplates an improved centrifugal force holding technique particularly useful for holding and gripping drills used in drilling printed circuit boards which overcome some of the disadvantages associated with the one known system. More particularly, the arrangement of the present invention is such as to greatly reduce the cost of an appropriate holding means for the drill, and yet provide the advantage of easy replacement for interchange of drills and assure a high degree of concentricity during operation.

Briefly, the foregoing is accomplished by providing a centrifugal system wherein a drill holding spindle is provided with radially contractable wall portions surrounding the shank of the drill received in the spindle. Centrifugal force generating means in the form of weights are coupled to the spindle for rotation therewith in a manner to exert contracting forces on the wall portions of the spindle so that the shank is gripped and held by the spindle by the generation of these centrifugal forces in response to rapid rotation of the spindle.

The structure of the centrifugal force generating means is such as to assure proper dynamic balancing to thereby in turn assure uniform gripping of the shank to maintain proper concentricity.

This invention also contemplates the provision of a positive engagement collar structure for use with larger sized drills in cooperation with the centrifugal arrangement wherein a positive engagement of the collar with appropriate flats on the drill spindle is provided to thus prevent any slippage under lower speed and higher torque conditions in the event the generated centrifugal forces are not sufficient.

BRIEF DESCRIPTION OF THE DRAWINGS

A better understanding of this invention will be had by now referring to the accompanying drawings in which:

FIG. 1 is a side elevational view partly broken away of a high speed drill spindle provided with centrifugal force generating means for gripping the shank of a drill shown exploded below the spindle preparatory to being received therein;

FIG. 2 is an end view partly in cross section of the spindle and force generating means looking in the direction of the arrows 2—2 of FIG. 1;

FIG. 3 is a symbolic illustration of the manner in which the various components making up the centrifugal force generating means are interleaved;

DETAILED DESCRIPTION OF THE PREFERRED EMBODIMENT

Figure 4:
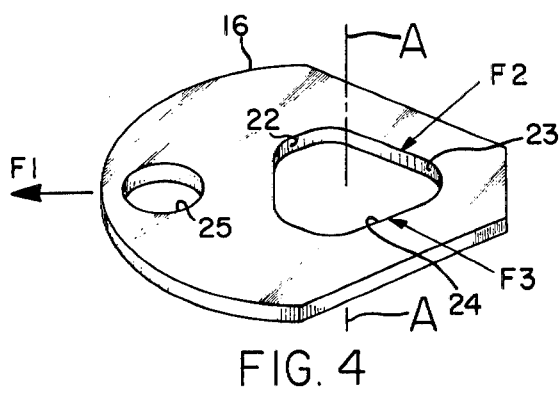
FIG. 4 is a perspective view of a lamination plate used in making up the centrifugal force generating means.

Referring first to FIG. 1, there is shown a high speed drill system in accord with the present invention including a drill holding spindle 10 arranged to be rotated at high speed as by a motor 11. The spindle 10 includes an interior axial bore 12 opening at its lower end 13, the exterior wall of the spindle 10 being provided with a plurality of exterior flats 14 at equal circumferentially spaced points on its exterior wall. These flats are better seen in the perspective view of FIG. 6 and in the preferred embodiment constitute three in number circumferentially spaced at 120°.

Figure 6:
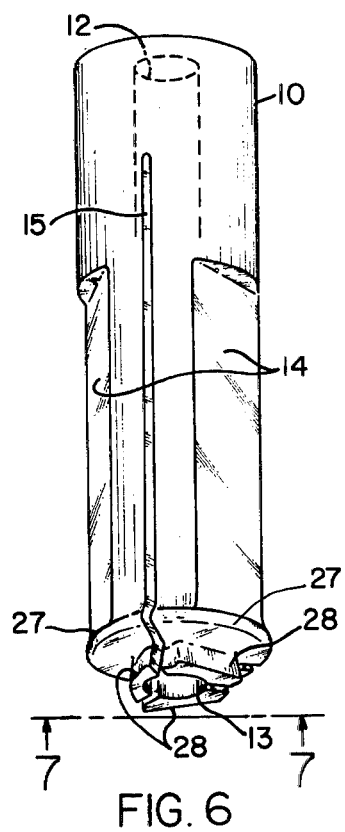
FIG. 6 is a fragmentary perspective view of the drill spindle of FIG. 1 without the centrifugal force generating means mounted thereon.

As also indicated in both FIGS. 1 and 6, the spindle 10 includes a similar plurality of exterior slots 15 extending from equal circumferentially spaced points between the flats radially inwardly to intercept the bore 12 and longitudinally along the spindle 10 from the one end 13 to points beyond the ends of the flats as shown.

With the foregoing arrangement, the flats can be biased radially inwardly to effectively decrease the cross sectional area of the bore 12 adjacent to the one end 13.

The centrifugal force generating means in accord with the present invention comprises a plurality of eccentric weight means 16, 17 and 18 surrounding the spindle 10 with their centers of mass at equally spaced radial distances from the axis A—A of the spindle. Further details of the eccentric weight means will be described shortly.

Shown below the spindle 10 is the shank 19 of a typical printed circuit board drill 20. Drills in the class of ⅛ inch diameter and under are each provided with a spring metal or plastic collar 21 pressed onto the ⅛ inch shank a set distance from the point of the drill to preset the depth of drilling by limiting the extent of the shank 19 received within the bore 12 of the spindle 10.

In the arrangement illustrated in FIG. 1, the spindle 10 is designed to produce enough friction to prevent the drill shank 19 from falling out of the spindle before rotation of the spindle starts. When the spindle is started, the centrifugal force developed by the eccentric weight means 16, 17 and 18 acts against the spindle flats to urge them radially inwardly and thus grip the drill shank and lock the same against rotational and longitudinal movement relative to the spindle.

Referring now to the end view of FIG. 2 along with FIG. 1, it will be noted that each of the eccentric weight means 16, 17 and 18 is in the form of a series of lamination plates stacked in a direction parallel to the spindle axis having off-center openings 22 through which the spindle 10 passes. In FIG. 2, the bottom lamination plate of the eccentric weight means 16 is shown in full lines, the bottommost plate of the eccentric weight means 17 having a portion thereof visible, the bottom lamination plate of the third series or set being indicated by the phantom lines 18.

The off-center opening 23 of each of the lamination plates defines internal edge segments such as indicated at 23 and 24. These segments are straight and in opposing engaging relationship with at last one and in the embodiment illustrated two adjacent flats 14 of the spindle on the opposite side of the axis of the spindle from the center of mass of the lamination plate. In the view of FIG. 2, for the lamination plate 16, the center of mass will be directly to the left of the spindle axis as a consequence of the geometry of the plate.

As also indicated in FIG. 2, the various series of lamination plates making up each of the eccentric weight means are provided with registering bores for receiving appropriate rivets which hold the assemblies together in interleaved fashion. One such rivet is shown at 25 for the series of plates 16.

The interleaving of the three series of lamination plates will become clearer by reference to FIG. 3 wherein the lamination plates making up each of the series of eccentric weight means 16, 17 and 18 are shown schematically as elongated cross section rectangles.

The respective plates in each of the series are held in given spaced relationship by appropriate washers 26 and it will be noted that by angulating each stack 120° from the remaining stacks, the lamination plates can be interleaved so that their centers of mass are equally circumferentially distributed about the axis A—A of the spindle.

Thus, as indicated in FIG. 3, each of the series of eccentric weights 16, 17 and 18 includes an identical number of lamination plates, this number being six in the particular embodiment disclosed. Further, it will be evident from the arrangement of FIG. 3 that the centrifugal forces developed by each stack will be of equal magnitude and directed radially outwardly from the central axis of the spindle at angles 120° to each other from the same axial point to provide dynamic balance.

Referring specifically to FIG. 4 which shows a single lamination plate such as that incorporated in the eccentric weight means or stack 16, the centrifugal force developed by this lamination plate when rapidly rotated about the spindle axis A—A is indicated at F1. This centrifugal force will tend to move the lamination plate to the left when positioned as shown in FIG. 4 resulting in wedging engagement of the edge segments 23 and 24 against the spindle flats 14 with forces indicated by the vectors F2 and F3. Because of the wedging action, the sum of the forces normal to the surfaces of the adjacent flats will actually be greater than the centrifugal force F1. As a consequence, there will be a large radial inward force on the flats of the drill spindle tending to contract the central bore 12 thereof and thus result in tight gripping of the drill shank.

By providing the series of lamination plates making up each set of eccentric weight means, the centrifugal forces can be properly distributed in an axial direction along the drill spindle for proper gripping of the drill shank. Excellent concentricity of the drill is assured by this specific arrangement and it will be appreciated that the higher the speed of rotation, the greater will be the gripping force.

Figure 5:
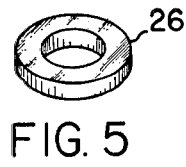
FIG. 5 is a perspective view of a washer used in the assembly of the centrifugal force generating means.

FIG. 5 illustrates a typical one of the spacer washers 26 illustrated schematically in FIG. 3.

Referring now to FIG. 6, further details of the specially designed drill spindle 10 will be evident. As shown, each of the flats 14 terminates at its lower end in a slightly raised flange or land 27. This land serves to hold the lamination plates in assembled relationship on the flats 14 when the same are assembled. Thus, the flats are radially contracted at the lower end 13 of the spindle 10 to permit the central openings in the lamination plates to ride over the lands, the spring bias of the exterior wall portions between the slots 15 returning the contracted wall flats to their normal position after all the lamination plates have been properly assembled in interleaved manner as described in conjunction with FIGS. 1 and 3.

In addition, the spindle 10 is preferably provided at its lower end 13, with further flats 28 below the lands 27.

Figure 7:
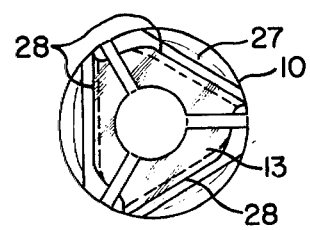
FIG. 7 is an end view of the spindle looking in the direction of the arrow 7—7 of FIG. 6.

FIG. 7 illustrates the flats 28 and the purpose for these particular flats is to permit a positive engagement to be effected with a drill wherein a large diameter drill is used which runs at a lower rotational speed and requires greater torque.

Figure 8:
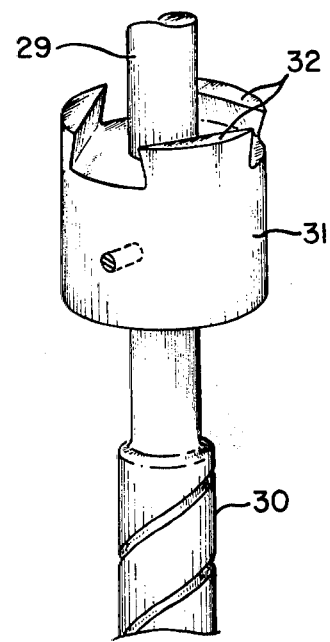
FIG. 8 is a fragmentary perspective view of a larger sized drill provided with a special collar in accord with the present invention.

FIG. 8 shows in fragmentary perspective view such a drill including a shank portion 29 and larger diameter drill body 30. For these larger type drills, rather than the spacing collar 21 for the smaller drills illustrated in FIG. 1 there is substituted a collar 31 secured to the shank 29 as by a set screw and provided with three lugs 32 circumferentially positioned such that they will engage the flats 28 when the shank 29 is received within the spindle 10 of FIG. 6. This coupling of the collar 31 to the flats 28 of the spindle will assure a positive lock of the drill shank against rotation relative to the spindle in those instances in which the centrifugal force developed does not provide sufficient gripping of the shank to overcome the applied torque.

It will be understood that the shank 29 of the larger drills is of precisely the same diameter as the shank 19 of the smaller sized drills illustrated in FIG. 1 so that only a single spindle construction is necessary to accommodate both high speed and low speed drills of various sizes.

OPERATION

In operation, each drill spindle in the event multiple drill spindles are provided in a circuit board drilling operation has mounted thereon eccentric weight means as illustrated in FIG. 1, the respective series of lamination plates being interleaved all as described to provide for dynamic balancing. When the spindle 10 is stationary, the shank 19 of a drill can readily be manually inserted in the lower end of the bore 12 and the design of the spindle 10 and slots 15 is such that a slight inward biasing of the flats will frictionally grip the shank 19 and hold the drill in place.

When the motor 11 of FIG. 1 is energized to rapidly rotate the spindle 10, the eccentric weight means made up of the three stacks of lamination plates will be thrown radially outwardly causing the edge segments of their internal openings to exert an inward radially directed biasing force on the flats of the spindle thereby gripping the shank 19 of the drill sufficiently to hold it during a drill operation.

When the drill spindle motor is de-energized so that the spindle stops rotating, the drill can be easily removed by simple manually pulling downwardly on the same.

Where low speed high torque larger diameter drills are used, the lugs 32 on the special collar 31 for the drill will engage the additional flats 28 at the lower end 30 of the spindle to provide a positive locking of the shank against rotation relative to the spindle. Again, when the spindle motor is energized and the spindle rotated at high speed, centrifugal forces will be generated to grip the shank and in cooperation with the locking collar assure that no slippage will occur. In this respect, the engaging inner flat surfaces of the lugs 32 are preferably at a very slight slope, the flats 28 at the end of the spindle similarly being sloped in an axial direction so that when the drill is fully inserted within the bore of the spindle, and clockwise torque is applied, the flats lock in dove-tail fashion to prevent the drill from pulling out as well as preventing further rotation. The action of the centrifugal force in gripping the shaft will further aid in preventing the drill from pulling out.

As in the case of the smaller drills, when the motor is de-energized, the larger drill can readily be removed by simply rotating slightly counterclockwise to unseat the lugs from the additional flats and then pulling downwardly thereon.

Since each of the lamination plates in each of the series or stacks of eccentric weight means are identically constructed; that is, of precisely the same geometry, the entire assembly can be provided with minimal costs as compared to prior art drill holding arrangements.

The present invention thus provides a low cost drill holding system for high speed drills wherein interchanging or replacement of drills can be very easily carried out and wherein the drill shank itself is gripped with uniform dynamically balanced forces to maintain proper concentricity.

What is claimed is:
1. A high speed drill system including, in combination:
   a. a drill holding spindle having an interior axial bore opening at one end and a plurality of exterior flats at equal circumferential spaced points on its exterior wall, said spindle including a similar plurality of exterior slots extending from equal circumferentially spaced points between said flats radially inwardly to intercept said bore and longitudinally along the spindle from said one end to points beyond the ends of said flats such that said flats can be biased radially inwardly to effectively decrease the cross sectional area of said bore adjacent to said one end; and
   b. a plurality of eccentric weight means surrounding said spindle with their centers of mass at equally spaced radial distances from the axis of the spindle and at equal circumferential spacing about said spindle, each weight means having straight internal segment means in opposed engaging relationship with at least one flat on the opposite side of the axis of said spindle from its center of mass, whereby high speed rotation of said spindle rotates said eccentric weight means to generate centrifugal forces and urge said segment means against said flats to move the flats radially inwardly so that when a drill shank is received in said one end of said bore, it is gripped by the inward movement of said flats to lock the drill shank against rotational and longitudinal movement relative to said spindle.

2. A system according to claim 1, in which each of said eccentric weight means is in the form of a series of lamination plates stacked in a direction parallel to the spindle axis having off-center openings through which said spindle passes, said interior segment means being defined by internal edge segments of said openings; and spacer washers between certain ones of said lamination plates in each of said weight means such that portions of the same may be interleaved to distribute equally the centers of mass of the weight means circumferentially and axially relative to the axis of said spindle.

3. A system according to claim 2, in which said spindle has three flats circumferentially spaced at 120°, and in which there are provided three eccentric weight means, said internal edge segments for each lamination plate constituting two segments angulated to each other to engage an adjacent pair of flats in a wedging action so that the sum of the force components acting normally on the flats is greater than the centrifugal force generated by the lamination plate.

4. A system according to claim 1, in which said drill holding spindle is provided with further flats at its end, said drill shank having a collar secured thereto with lug means for engaging said further flats when said shank is received in the bore of said spindle to provide a positive lock of said drill shank against rotation relative to said spindle.

5. A system according to claim 4, in which said further flats are sloped slightly in an axial direction, said lug means having a matching slope to engage the flats in dove-tail fashion and lock the shank against pulling out in an axial direction as well as against rotation relative to said spindle so long as torque is maintained.

* * * * *